E. D. TILLYER.
OPHTHALMIC MOUNTING.
APPLICATION FILED JUNE 26, 1916.
1,222,049.
Patented Apr. 10, 1917.
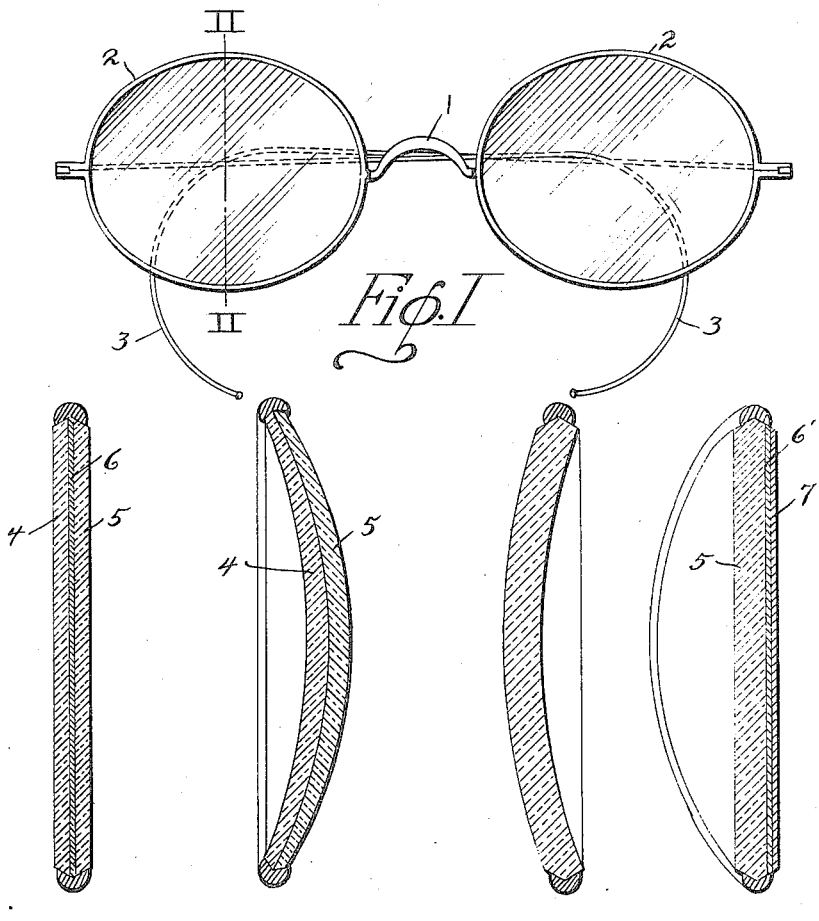
WITNESS
INVENTOR
Edgar D. Tillyer
BY
ATTORNEYS

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,222,049.  Specification of Letters Patent.  Patented Apr. 10, 1917.

Application filed June 26, 1916. Serial No. 106,026.

*To all whom it may concern:*

Be it known that I, EDGAR D. TILLYER, a citizen of the United States, residing at Southbridge, in the county of Worcester and State of Massachusetts, have invented certain new and useful Improvements in Ophthalmic Mountings, of which the following is a specification.

My invention relates to improvements in ophthalmic mountings, and has particular reference to an improved construction of spectacle particularly adapted for wear by persons working under conditions of extreme light, or where for some reason it is desirable that certain light rays be eliminated or their proportions varied.

The leading object of my invention, therefore, resides particularly in the provision of an improved construction or composition of lens adapted to be placed before the eye which shall have the property of selective absorption or refraction as to certain of the rays of the visible and if desired a similar property as regards the rays of the invisible spectrum, whereby only the proper and desired rays or rays in proper and desired portions shall be admitted through the spectacle to the eye.

A further object of my invention is the provision of an improved construction of spectacle which may be worn by persons engaged in welding or similar operations, and which will enable such persons to look through the glow or luminosity at the point of welding and determine the condition of the work itself at the point of operation.

A further object of the invention is the provision of an improved construction which will not only enable the operator to look through the glare at this point, but will enable him to do so without materially altering or noticeably dimming any of the colors of the visible spectrum and at the same time will, if desired, cut out or eliminate the rays of the invisible spectrum at one or both ends of the visible spectrum, as desired.

Other objects and advantages of my improvement should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting embodying my improvement.

Fig. II represents a sectional view taken as on the line II—II of Fig. I.

Fig. III represents a similar view of a slight modification.

Fig. IV represents a similar view of another embodiment of my invention.

Fig. V represents a like sectional view of another modification thereof.

In the drawings, the numeral 1 designates the usual bridge piece of an ophthalmic mounting serving to connect the frame members 2 provided with the temples or securing devices 3 for retaining the mounting in position on the face. Said mounting has secured within the eye wire or frame portion 2 improved lenses constructed in accordance with and embodying the principles of my invention.

Referring specifically to these lenses, Fig. II shows a sectional view of one embodiment of the lens comprising the glass or transparent media 4 and 5 and the intermediate transparent medium 6. These several media may be of different materials or in any event of materials having different properties, as for example, the medium 4 may be a glass or transparent composition which is unaffected by the infra red or heat rays, but which has the property of filtering out or absorbing the harmful chemical or ultra violet rays. Adjacent this may be placed if desired, a thin transparent metallic film or other transparent medium 6 having the property of either reflection or absorption of infra red or heat rays which might prove harmful to the eye.

In addition to these I place in position the third medium which may be a suitable glass or the like having the property of selective absorption of certain rays in the visible spectrum, or whose wave lengths are within the wave lengths of the visible spectrum. This substance may differ according to the particular wave lengths which it is desired to absorb, for purposes of further illustration in connection with the present application one specific element and purpose being referred to, but it being understood that the medium 5 may be varied according to the wave lengths to be absorbed. In the present instance I have in mind particularly the difficulties met with in connection with welding or the like. For example, when two plates are to be joined together a flux of borax or similar material is frequently employed. When the welding heat is applied this causes a yellowish glare or haze at the point of work due to the presence of sodium and renders it practically impossible on account of this intense yellow glare to properly see the work and determine its condition during the welding operation. When I desire to eliminate this particular portion of the rays, or at least the excess of the sodium or yellow rays to look through or enable the welder to what is termed "look through" the sodium glare, that is to say, to see the work beneath this glare, I may employ the composition known as didymium for the medium 5, the didymium having a transparency to the larger part of the spectrum but having a pronounced absorption band corresponding substantially in wave lengths of the sodium flame. Consequently when this is employed the sodium flame glare will be practically entirely absorbed without in any way affecting the remainder of the spectrum, although enabling the welder to see through this glare and keep track at all times of the progress and condition of the work.

It will be understood that under certain conditions it will be desirable to eliminate, for example, the harmful chemical rays and a certain proportion or selected part of the visible spectrum without necessarily providing against the action of the heat rays. In this event I may if desired, employ the construction shown in Fig. III for example, in which the medium 4 for absorption or reflection of the chemical rays is employed in connection with the medium 5 having the power of selective retardent absorption or reflection as the case may be, of certain of the rays of the visible spectrum.

Likewise, under some conditions the elements going to make up the medium 4 and the elements going to make up the medium 5 may be comingled in formation to provide a single member as shown in Fig. IV, which shall combine the several properties referred to in an integral or homogeneous structure. On the other hand, likewise instances may occur when it is desirable to reflect the entire invisible spectrum and to eliminate by retardent absorption or reflection a selected portion of the visible spectrum. This may be accomplished as indicated in Fig. V for example, by employing the medium 5 in connection with the pair of metallic films or the like 6' and 7, one of said films in this event being formed from a material adapted to reflect infra red and the other of the films from a material to reflect ultra violet, or the two members 6' and 7 may be combined in a single alloy and then deposited upon the medium 5 in which event but the two parts will appear, the metallic film, however, having in this event the property of selective reflection of certain major wave lengths and certain minor wave lengths, while the medium 5 bearing this combination metal or alloy will suitably dispose of the portion of the visible spectrum which it is desired to eliminate.

For a more clear understanding of the matter just referred to I would mention that a compound of gold and silicon, for example, might be employed for the transparent metal film, in that the gold has the property of selective reflection of the infra red rays, while the silicon has a similar property as regards the ultra violet rays. It will be understood that these parts are mentioned merely for purposes of illustration, in that many other elements possess similar properties and may be combined according to individual taste or the particular result to be obtained without in any way departing from or exceeding the spirit of my invention.

From the foregoing description taken in connection with the accompanying drawings, the manner of carrying out of my invention and the basic principles involved should both be readily apparent, and it will be seen that I have provided an improved construction for spectacles or the like which will not only protect the eye from injurious rays of the invisible spectrum but in addition will selectively eliminate excessive rays of any particular wave length according to the material employed and consequently eliminate glare or distorted vision due to an unbalanced spectrum of this character and will permit the person wearing the glasses, if so desiring, to see the spectrum in its natural condition without undue glare and without harmful chemical or heat rays impinging upon the eye.

I claim:

1. In a lens, the combination of a medium adapted to retard certain rays outside the visible spectrum and a medium adapted to retard a selected portion of the visible rays.

2. In an ophthalmic mounting, a lens having the property of selective retardance of wave lengths both greater than and less than those of the visible spectrum and having the property of selective retardance of predetermined rays only of the visible spectrum.

3. An ophthalmic lens, comprising a transparent base medium and separate metallic elements deposited thereon in the form of a film, one of said elements having the power of selective reflection as to infra red rays and another of said elements having the power of selective reflection as to ultra violet rays.

4. An ophthalmic lens, comprising a medium having the properties of selective absorption of a predetermined portion of the visible spectrum, a second medium having the properties of selective reflection as to infra red rays, and a third medium having the property of selective reflection as to ultra violet rays, whereby said lens will reflect both ends of the visible portion of the spectrum and will absorb a selected or predetermined portion or excess of the visible spectrum, substantially as described.

5. An ophthalmic lens formed from apparently uncolored transparent material but embodying a medium which will refuse to transmit wave lengths greater than those of the visible spectrum, and a second medium which will refuse to transmit selected portions of the visible spectrum.

6. An ophthalmic lens of apparently colorless transparent material, including media which will refuse transmission to wave lengths less than those of the visible spectrum and to selected wave lengths intermediately of the visible portion of the spectrum.

7. An ophthalmic lens formed from apparently transparent material, including media which will refuse transmission to wave lengths less than and greater than those of the visible spectrum, and will refuse transmission to certain selected wave lengths of a central portion of the visible spectrum.

In testimony whereof I affix my signature in the presence of two witnesses.

EDGAR D. TILLYER.

Witnesses:
  H. K. PARSONS,
  G. F. FLOOD.